(12) United States Patent
Betts et al.

(10) Patent No.: US 12,190,030 B2
(45) Date of Patent: Jan. 7, 2025

(54) APPARATUS AND METHOD FOR ELECTRONIC SYSTEM COMPONENT DETERMINATION AND SELECTION

(71) Applicant: PREDICTIVEIQ LLC, Boston, MA (US)

(72) Inventors: Daniel Augusto Betts, Parkland, FL (US); Juan Fernando Betts, Parkland, FL (US)

(73) Assignee: PREDICTIVEIQ LLC, Boston, MA (US)

( * ) Notice: Subject to any disclaimer, the term of this patent is extended or adjusted under 35 U.S.C. 154(b) by 374 days.

(21) Appl. No.: 17/091,411

(22) Filed: Nov. 6, 2020

(65) Prior Publication Data

US 2021/0133377 A1 May 6, 2021

Related U.S. Application Data

(60) Provisional application No. 62/931,539, filed on Nov. 6, 2019.

(51) Int. Cl.
*G06F 30/27* (2020.01)
*G06F 3/0482* (2013.01)
(Continued)

(52) U.S. Cl.
CPC ............ *G06F 30/27* (2020.01); *G06F 3/0482* (2013.01); *G06F 30/17* (2020.01);
(Continued)

(58) Field of Classification Search
CPC ........ G06F 30/27; G06F 3/0482; G06F 30/17; G06F 30/12; G06F 30/20;
(Continued)

(56) References Cited

U.S. PATENT DOCUMENTS 10,185,333 B2 *   1/2019   Egan ................. G05D 13/62
10,289,788 B1 *   5/2019   Kumar ............... G06F 16/288
(Continued)

FOREIGN PATENT DOCUMENTS

EP           3483754      *  5/2019   ............. G06F 17/50
WO     WO2014/143729      *  9/2014   ............. G06F 17/00

OTHER PUBLICATIONS

Sugumaran et al. "A Semantic-Based Approach to Component Retrieval" The Data Base for Advances in Information Systems—Summer 2003, vol. 34, No. 3 [retrieved on Nov. 18, 2022] (Year: 2003).*

(Continued)

*Primary Examiner* — Kamini S Shah
*Assistant Examiner* — Alfred H B Wechselberger
(74) *Attorney, Agent, or Firm* — DUANE MORRIS LLP; Gregory M. Lefkowitz; Joaquin Hernandez (57) ABSTRACT

This application relates to apparatus and methods for electronically generating, and executing, component models for systems and system components, and determining component options for the system based on the executed component models. In some examples, a computing device generates component models for one or more components of a system. The component models may be based on features, inputs, and outputs to each system component. The computing device may execute the component models to determine one or more requirements for each component. The computing device may then search a database to determine component options that can satisfy the one or more requirements. In some examples, the computing device may display the determined component options, and may allow for the selection of one or more of the determined component options. In some examples, the computing device may allow for the purchase of the component options.

14 Claims, 7 Drawing Sheets

(51) Int. Cl.
*G06F 30/17* (2020.01)
*G06F 111/20* (2020.01)
*G06Q 30/0601* (2023.01)

(52) U.S. Cl.
CPC ..... *G06Q 30/0621* (2013.01); *G06Q 30/0641* (2013.01); *G06F 2111/20* (2020.01)

(58) Field of Classification Search
CPC ........ G06F 2111/00–2119/22; G06Q 30/0621; G06Q 30/0641; G06N 5/003; G06N 20/00
See application file for complete search history.

(56) References Cited

U.S. PATENT DOCUMENTS

| | | | |
|---|---|---|---|
| 2014/0214392 A1 | 7/2014 | Miller | |
| 2015/0160792 A1* | 6/2015 | Yang | G06F 3/0482 715/810 |
| 2017/0193143 A1 | 7/2017 | Saha | |
| 2018/0349795 A1* | 12/2018 | Boyle | G06Q 10/063 |
| 2020/0401113 A1* | 12/2020 | Yuan | G05B 19/41865 |
| 2021/0081588 A1* | 3/2021 | Osburn | G06F 30/31 |
| 2021/0192568 A1* | 6/2021 | Taghavi Nasr Abadi | G06N 20/20 |

OTHER PUBLICATIONS

Sugumaran et al. "A Semantic-Based Approach to Component Retrieval" The Data Base for Advances in Information Systems—Summer 2003 (vol. 34, No. 3) [retrieved on Sep. 9, 2023] (Year: 2003).*

Frutos et al. "Decision Support System for Product Configuration in Mass Customization Environments" Concurrent Engineering: Research and Applications, vol. 12, No. 2 2004 [retrieved on Sep. 9, 2023] (Year: 2004).*

Neugebauer, T. "Computer-Aided Design and Optimization of dc/de Power Converters" [Thesis] Union College, Electrical Engineering Department [retrieved on Jan. 17, 2024] (Year: 1997).*

Li et al. "A Process Oriented Hybrid Resource Integration Framework for Product Variant Design" Journal of Computing and Information Science in Engineering, Dec. 2012, vol. 12; DOI: 10.1115/1.4007765 [retrieved Apr. 3, 2024] (Year: 2012).*

Zha et al. "Platform-based product design and development: A knowledge-intensive support approach" Knowledge-Based Systems, vol. 19; doi:10.1016/j.knosys.2006.04.004 [retrieved on Apr. 3, 2024] (Year: 2006).*

* cited by examiner

APPARATUS AND METHOD FOR ELECTRONIC SYSTEM COMPONENT DETERMINATION AND SELECTION

CROSS-REFERENCE TO RELATED APPLICATIONS

This application claims the benefit of U.S. Provisional Patent Application No. 62/931,539, filed Nov. 6, 2019, and entitled "Apparatus and Method for Electronic System Component Determination and Selection," which is hereby incorporated by reference in its entirety.

FIELD OF THE INVENTION

The disclosure relates generally to electronic system simulation systems and, more specifically, to determining system components based on electronic system and component modelling and simulation.

BACKGROUND

Emulators, Response Surface Models (RSMs), and Reduced Order Models (ROMs) are a class of predictive analytics methods (collectively referred to as Surrogate Models or "SMs") that can predict an output of a system based on a set of input parameters. Outputs can include the performance of a machine, the failure rate of a component, or a classification. SMs are typically used to predict system outcomes before they occur.

SUMMARY

In some examples, a computing device is configured to receive a selection of a component of a system, and execute a modeling process for the component. The computing device may also be configured to determine at least one parameter for the component based on the execution of the modeling process for the component, and determine a plurality of component options for the component based on the at least one parameter. Further, the computing device may be configured to display the plurality of component options.

In some examples, a method by a computing device includes receiving a selection of a component of a system, and executing a modeling process for the component. The method also includes determining at least one parameter for the component based on the execution of the modeling process for the component. Further, the method includes determining a plurality of component options for the component based on the at least one parameter. The method also includes displaying the plurality of component options.

In some examples, a non-transitory computer readable medium has instructions stored thereon, wherein the instructions, when executed by at least one processor, cause a device to perform operations includes: receiving a selection of a component of a system; executing a modeling process for the component; determining at least one parameter for the component based on the execution of the modeling process for the component; determining a plurality of component options for the component based on the at least one parameter; and displaying the plurality of component options.

In some examples, a computing device configured to receive a request for a validation of a system component, where the request identifies at least one requirement for the system component. The computing device is also configured to execute a component modeling process based on at least one input, and at least one output, of the system component. Further, the computing device is configured to determine that the at least one requirement is satisfied based on the execution of the component modeling process, and determine at least one parameter for the system component based on the execution of the component modeling process. The computing device is also configured to determine a plurality of component options for the system component based on the at least one parameter, and display the plurality of component options.

In some examples, a method by a computing device includes receiving a request for a validation of a system component, wherein the request identifies at least one requirement for the system component. The method also includes executing a component modeling process based on at least one input, and at least one output, of the system component. Further, the method includes determining that the at least one requirement is satisfied based on the execution of the component modeling process, and determining at least one parameter for the system component based on the execution of the component modeling process. The method also includes determining a plurality of component options for the system component based on the at least one parameter, and displaying the plurality of component options.

In some examples, a non-transitory computer readable medium has instructions stored thereon, where the instructions, when executed by at least one processor, cause a device to perform operations includes: receiving a request for a validation of a system component, wherein the request identifies at least one requirement for the system component; executing a component modeling process based on at least one input, and at least one output, of the system component; determining that the at least one requirement is satisfied based on the execution of the component modeling process; determining at least one parameter for the system component based on the execution of the component modeling process; determining a plurality of component options for the system component based on the at least one parameter; and displaying the plurality of component options.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
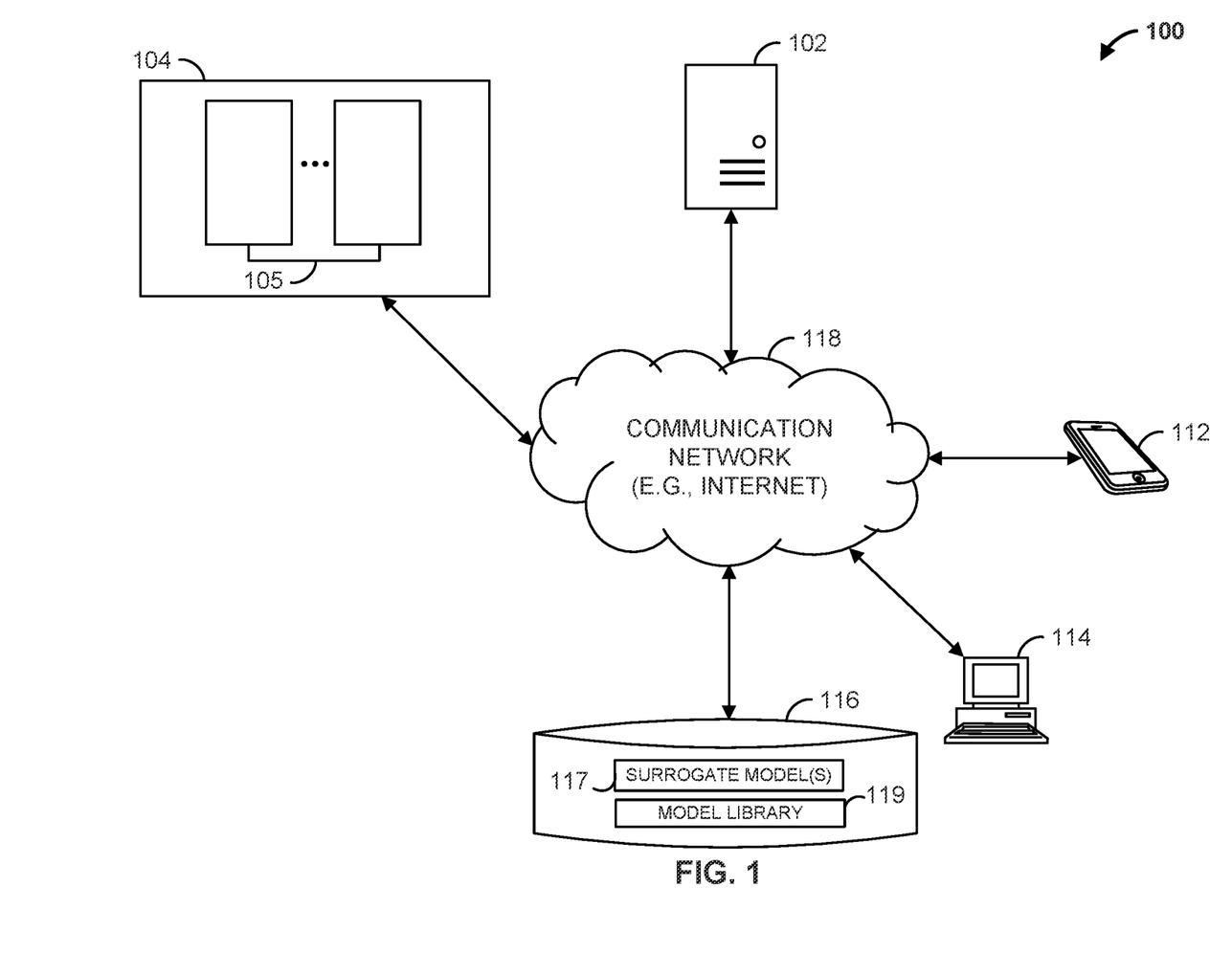
FIG. 1 is a block diagram of a component model system in accordance with some embodiments.

Turning to the drawings, FIG. 1 illustrates a block diagram of a component model system 100 that includes a component model computing device 102, a system 104, database 116, and multiple customer computing devices 112, 114 communicatively coupled over network 118. Component model computing device 102 and multiple customer computing devices 112, 114 can each be any suitable computing device that includes any hardware or hardware and software combination for processing and handling information. For example, each of component model computing device 102 and multiple customer computing devices 112, 114 can include one or more processors, one or more field-programmable gate arrays (FPGAs), one or more application-specific integrated circuits (ASICs), one or more state machines, digital circuitry, or any other suitable circuitry.

In some embodiments, component model computing device 102 can be a computer, a workstation, a laptop, a server such as a cloud-based server or an application server, or any other suitable device. Each of multiple customer computing devices 112, 114 can be a computer, a workstation, a laptop, a tablet, a personal assistant device, a voice assistant device, a digital assistant device, or a mobile device such as a cellular phone or smart phone. In addition, each of component model computing device 102 and multiple customer computing devices 112, 114 can transmit data to, and receive data from, communication network 118.

Figure 2:
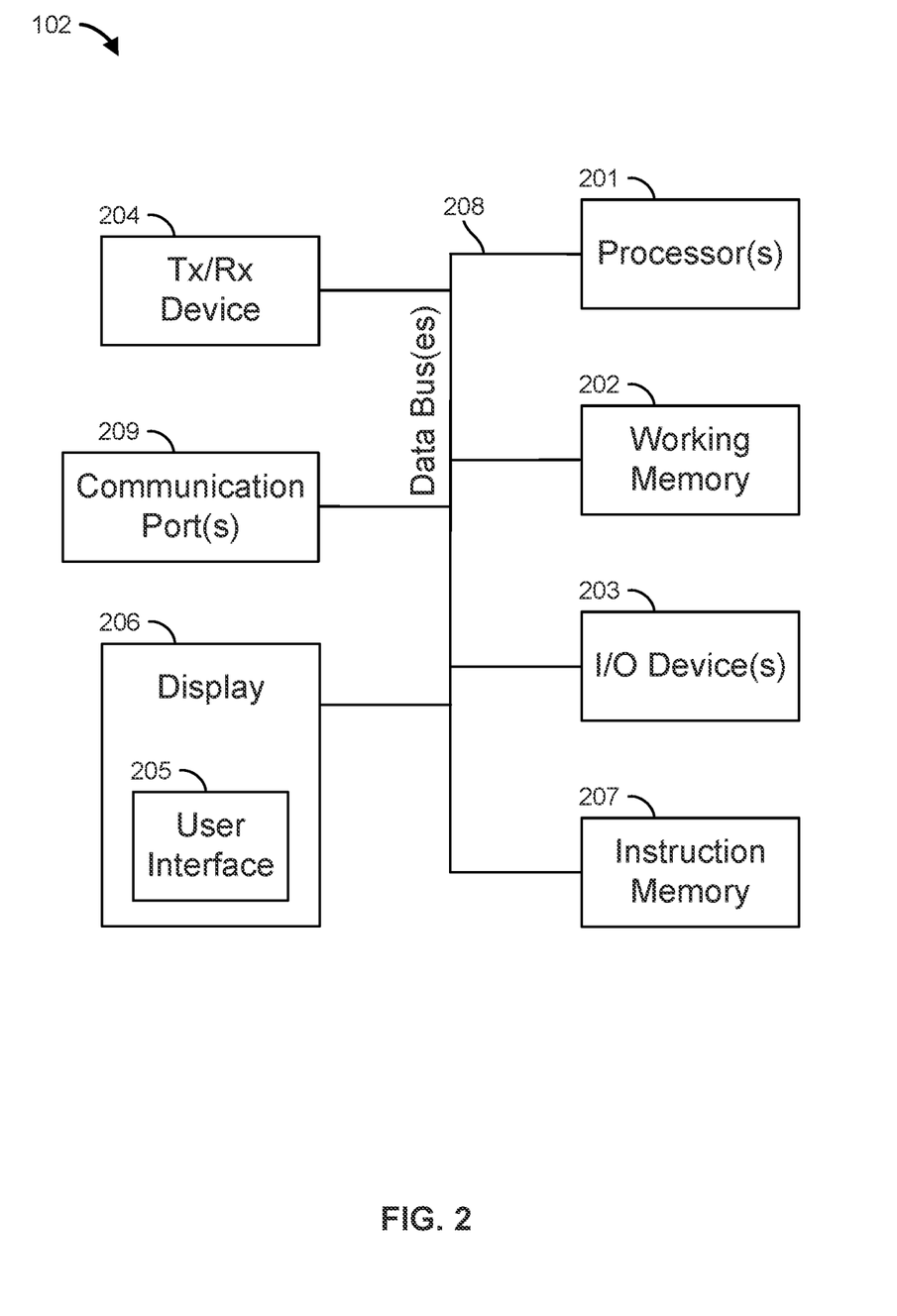
FIG. 2 is a block diagram of the component model computing device of the component model system of FIG. 1 in accordance with some embodiments.

FIG. 2 illustrates an example of a component model computing device 102. Component model computing device 102 includes one or more processors 201, working memory 202, one or more input/output (I/O) devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory, an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of component model computing device 102. Working memory 202 can be a random access memory (RAM) such as a static random access memory (SRAM) or dynamic random access memory (DRAM), or any other suitable memory.

I/O devices 203 can include any suitable device that allows for data input and/or output. For example, I/O devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as component model data.

Display 206 can display user interface 205. User interfaces 205 can enable user interaction with component model computing device 102. For example, user interface 205 can be a user interface for an application of a retailer that allows a customer to initiate the return of an item to the retailer. In some examples, a user can interact with user interface 205 by engaging I/O devices 203. In some examples, display 206 can be a touchscreen, where user interface 205 is displayed on the touchscreen.

Transceiver 204 allows for communication with a network, such as communication network 118 of FIG. 1. For example, if communication network 118 is a cellular network, transceiver 204 is configured to allow communications with the cellular network. Processor(s) 201 is operable to receive data from, or send data to, a network, such as communication network 118, via transceiver 204.

Referring back to FIG. 1, system 104 can be any system that takes in one or more inputs, and produces one or more outputs. Inputs and outputs may include, for example, data (e.g., signal data, control data, sensor data, specification data), material, fuel, or any other input. System 104 can include any number of subsystems 105 that are operatively or communicatively coupled to each other. For example, a first subsystem 105 of system 104 may receive one or more system inputs, and provide one or more subsystem outputs. A second subsystem 105 of system 104 may receive one or more of the outputs of the first subsystem 105, and provide one or more subsystem outputs. Similarly, system 104 may include additional subsystems. System 104 may provide one or more outputs, such as one or more outputs of any subsystem 105.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Component model computing device 102 is operable to communicate with database 116 over communication network 118. For example, component model computing device 102 can store data to, and read data from, database 116. In this example, database 116 may store data identifying and characterizing one or more component models (CMs) 117. For example, component model computing device 102 may obtain and execute a component model 117. Database 116 can be a remote storage device, such as a cloud-based server, a memory device on another application server, a networked computer, or any other suitable remote storage. Although shown remote to component model computing device 102, in some examples, database 116 can be a local storage device, such as a hard drive, a non-volatile memory, or a USB stick.

Although FIG. 1 illustrates two customer computing devices 112, 114, component model system 100 can include any number of customer computing devices 112, 114. Similarly, component model system 100 can include any number of component model computing devices 102, systems 104, and databases 116.

In some examples, component model computing device 102 may generate one or more component models (CMs) 117, and store them in database 116. One or more of customer computing devices 112, 114 may access and execute component models 117. Each CM may include an architecture that employs physics or mathematically informed approaches (simplified physics, finite element analysis, chemical processes, etc.) and/or data-driven statistical approaches (regression, multivariate statistics, Bayesian approaches, Uncertainty Quantification (UQ) methods, etc.) in a multi-stage structure. The CMs can be trained, improved, and validated to optimize predictive capabilities.

A generated CM may predict the output (O) of a system to received inputs ($\bar{x}$). Each output can be, for example, a quantification of present states, past states, or future states of the system. For example, a CM may be generated to predict the remaining useful life of a component of an engine. In this case, the CM may predict present machine states and future machine states of the engine. The output of the CM ($O_{SM}$) may be a prediction of O. Therefore, an error (E) (e.g., a system error) may be defined as $O - O_{SM}$, in other words, the difference between an output O of the system and the predicted output of the system $O_{SM}$. The output of the system O can be identified by, for example, experimental data, field data, IoT data, and/or simulation results.

System Component Selection

The disclosures include systems and methods that allow for the identification and selection of components that work together in a systematic way. Models may be developed that allow for the modelling of the system, and system components, using physics, engineering, empirical, and statistical methods known in the art of engineering and science, such as the CMs as disclosed herein. For example, a model for a system component may take inputs from predicted performance inferred by model results from models modeling one or more other interacting components. The problem of selecting a component, as well as the component's design parameters, can be accomplished by evaluating a catalogue set of virtual components whose design parameters are based on actual components available for use by the engineer in the design. The virtual components can be selected by comparing candidate component design parameters and/or their performance to optimum component design parameters and/or optimum component performance for a given system. This can allow the engineer to discern existing, real components, and their particular effect on machine performance, enabling greater certainty in component selection.

Development of a computation model for a system made up of components of different types, such as pumps, blowers, mechanical structures, heat exchangers, fluid conveyance devices, etc., in which the interactions between each of the components is defined by physics, engineering, statistical, or empirical relationships, can be defined by the design engineer constructing the system model.

A database, such as database 116, may store a model library 119, which can include existing computational models of components of various types that have design features that define the particular performance of each component. These design features, and thus the performance of these components, are based on features of real-world components that are readily available, such as commercial off-the-shelf (COTS) parts.

In some examples, the CMs allow for the optimization of component design features to meet desired system performance parameters (e.g., as defined by a user of the model). The optimization may include optimization methods such as linear programming, second order cone programming, conic programming, geometric programming, integer programming, quadratic programming, fractional programming, non-linear programming, stochastic programming, robust programming, combinatorial optimization, stochastic optimization, infinite-dimensional optimization, heuristic results, constraint satisfaction, and disjunctive programming, for example. This feature optimization may also include a temporal quality. In addition, the desired performance of the system may be time dependent or transient. In these cases, component feature optimizations techniques may rely on heuristic methods such as memetic algorithms, differential evolutions, evolutionary algorithms, dynamic relaxation, genetic algorithms, Nelder-Mead algorithms, particle swarm optimizations, cuckoo searches, gravitational search algorithms, artificial bee colony optimizations, simulated annealing, stochastic tunneling, Tabu searches, and Reactive Search Optimization, among others. The implementation of any of the previously mentioned feature optimization methods, or any other method known in the art, results in a matrix of optimum features (i.e., optimal feature matrix) that may match the optimum or desired performance of the system or system component. The desired performance of the system can be multi-variate or multi-attribute, for example, and can be based on the maximization of certain attributes, the minimization of certain attributes, the definition of limits for attributes, and user defined tradeoffs between attributes.

An optimal feature matrix is developed for each of the system's components, and is compared with features of components in a database (e.g., model library 119 stored in database 116). Components from the database that most closely match the optimum features may be selected. The selection can be done through ranking based on overall proximity of component features to optimum component features. In some embodiments, this ranking can be determined based on any suitable ranking algorithm. In some examples, the ranking is determined based on a mean squared error (MSE), that can be defined as:

$$MSE = \frac{\sum_{i=1}^{N}(f_{p,i} - f_{o,i})^2}{N}$$

Here, $f_{p,i}$ is the ith feature of a candidate component, $f_{o,i}$ is the ith optimum feature for the corresponding component in a system, and N is the total number of features in the candidate component and its corresponding component in the system. Another example is the use of a weighted mean square error (WMSE), such as one defined as:

$$WMSE = \frac{\sum_{i=1}^{N}W_i(f_{p,i} - f_{o,i})^2}{N}$$

Here, $W_i$ is the ith weighting. The weightings can be set by the design engineer or can be determined based on their impact on the key performance parameters of the component, such that features with higher impact have a higher weight than those with a lower impact. MSE and WMSE can also be defined using scaled feature variables so that their range is commonly bounded. In this way, differences in feature dimensions do not impact the MSE or WMSE. Other methods for error evaluation as known in the art of statistics and machine learning can also be employed.

A system model, such as an SM, may then be executed using selected components. The performance of the system may then be evaluated with respect to a desired performance. The design engineer can be provided with an analysis in which the modeled performance of the system and its deviation from optimum and desired performance is provided. With this data, the design engineer has an opportunity to select parts with automated engineering rigor.

In some examples, the system and component models are in the form of computer executable code (e.g., an application) that is executed by a computer or server, such as component model computing device 102, which may execute the models automatically. The embodiments may allow for a significant increase in a design engineer's productivity by leveraging a search for components for which models have been developed. In particular, after a device is modeled, the system and component model can be used to cross-reference commercially available and properly sized components that can be used to produce the optimized device. From a commercial basis, vendors of components would have a strong incentive to create models of components that they produce or sell to incorporate them in the component database (e.g., model library 119 stored in database 116), which can be searchable. In this way, the vendor's component becomes discoverable by the design engineer, the part's features can be evaluated in the context of the system that is being designed, and, thereby reduce the risk that a component selected by the engineer is found unsuitable (e.g., breaks, fails, or is returned) upon testing.

In some embodiments, a system allows a user to select a component or product based on evaluations using CMs. In the design of a system or a product, a set of specifications are developed for the components of the system. For example, if an engineer were to design an air conditioning system to achieve a certain cooling effect at a certain efficiency, the engineer may need to design or select heat exchangers for the system's evaporator and condenser, as well as, a compressor, expansion valve, fans, and blowers. Each of these components may have a profound effect on the performance of the system. Thus, proper component selection can be important to meet the desired performance of the air conditioning system. In some embodiments, a database of CMs for multiple selectable versions of these components is described. In some embodiments, the system automatically searches for components and evaluates each component through execution of each component's corresponding SM. As a result, the system uses the model to automatically select components that perform at or near the level of the design developed using the model. In some examples, the search process is automated based on optimization of the overall system through automated component selection to meet one or more desired outcomes (e.g., system or component requirements). In some examples, a user can search a database (e.g., via a computing device) of components to determine if they meet performance specifications (e.g., system or component requirements).

Figure 3:
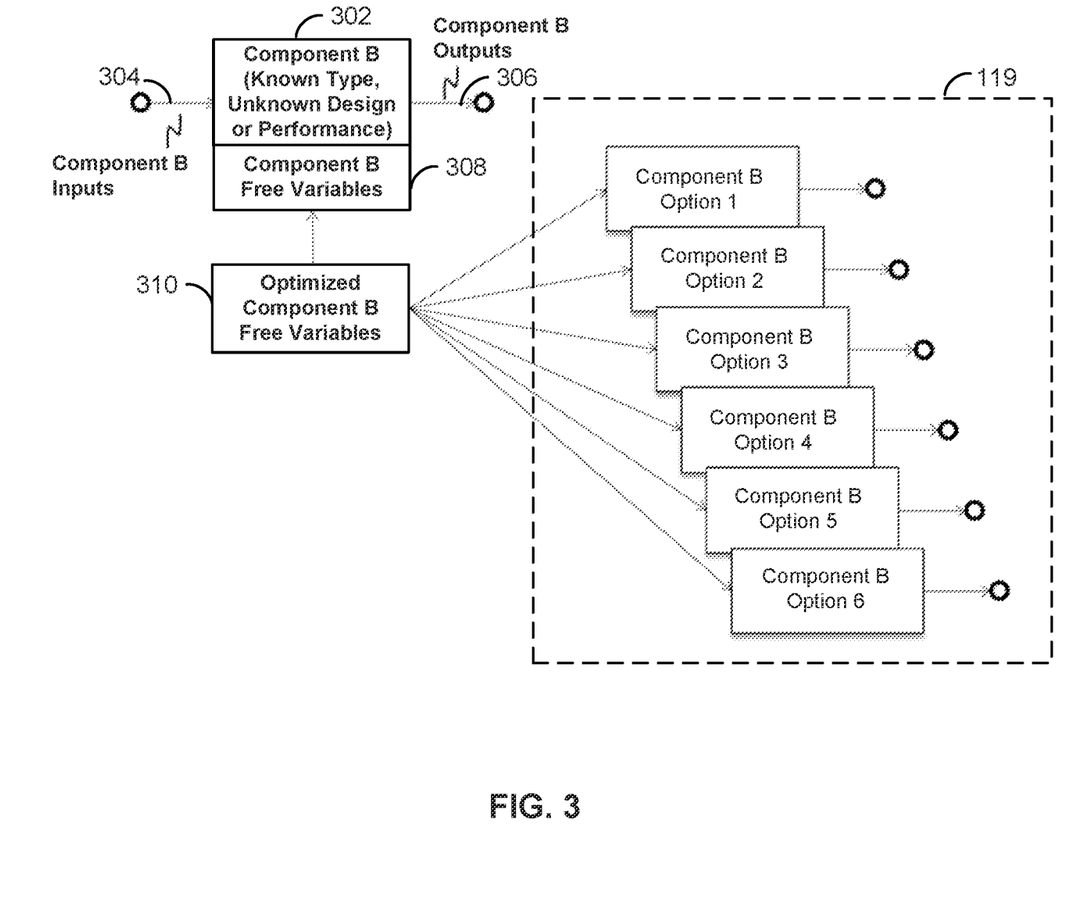
FIG. 3 illustrates the selection of a substitute component from a model library in accordance with some embodiments.

FIG. 3 illustrates the selection of a substitute or suggested component from a model library, such as model library 119 residing in database 116, for a component B 302. Component B 302 may be a component of a system that is being modelled, such as with an CM as described herein. In some embodiments, component B 302 may receive inputs 304. Inputs 304 may include inputs from outside the system, inputs from other components of the system, or inputs generated by the system. Component B 302 provides outputs 306. Outputs 306 may be provided to other components within the system, or can be provided outside the system (e.g., as an output of the system). In addition, component B 302 may include one or more free variables 308, which may identify variable ranges, variable thresholds, or variable requirements of component B 302 as determined by execution of a corresponding CM for component B 302.

In this example, assume that an SM, such as one based on a physics model that was generated by component model computing device 102, generates optimized component B free variables 310, which identify one or more requirements for component B free variables 308 for component B 302. For example, a component that is able to meet the requirements of optimized component B free variables 310 can receive component B inputs 304 and generate component B outputs 306 in a more efficient manner than another component option for component B 302.

Component model computing device 102 may determine one or more component options for component B 302 based on optimized component B free variables 310. For example, model library 119 may include computational models for component options for component B 302. The component models may be CMs, such as physics based CMs as generated by component model computing device 102, for actual components (e.g., actual components that maybe used in the system for component B 302). Component model computing device 102 may determine, based on the component models in model library 119, one or more component options that can receive component B inputs 304 and provide component B outputs 306 while satisfying optimized component B free variables 310. For example, component model computing device 102 may search model library 119 for components for component B 302 with the closest free variables to those identified by optimized component B free variables 310 (e.g., the component that most closely satisfies requirements identified by optimized component B free variables 310). Component model computing device 102 may then provide the determined component options to a user of component model computing device 102. For example, component model computing device 102 may display the component options, via display 206, to an engineer designing the system.

In some examples, component model computing device 102 determines the performance of the system based on a selected option for component B 302. The performance of the system may be displayed to the user, for example. In some examples, component B free variables 308 and optimized component B free variables 310 are displayed. For example, component model computing device 102 may display a comparison of component B free variables 308 and optimized component B free variables 310.

Figure 4A:
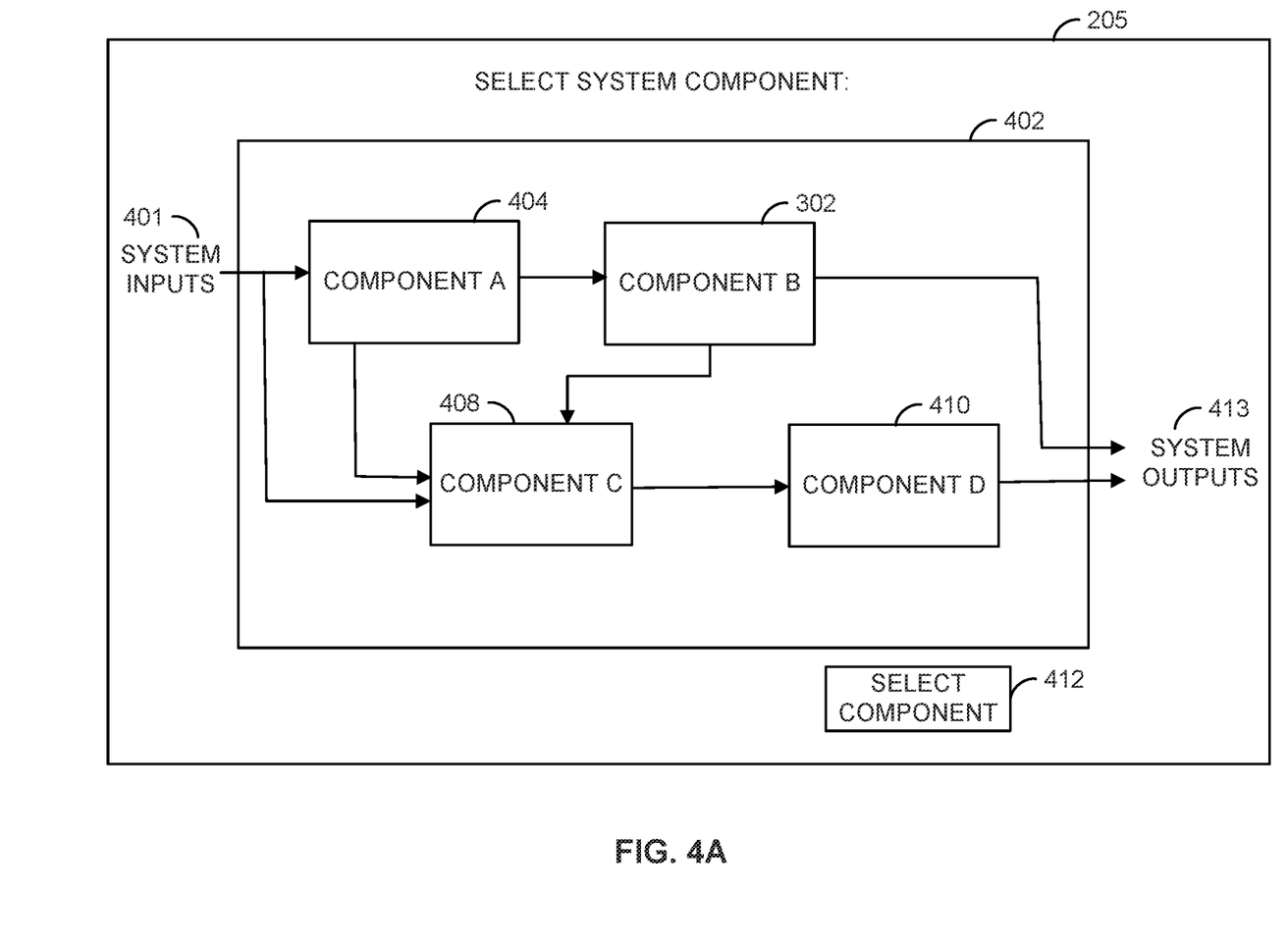
FIG. 4A illustrates a user interface allowing for the selection of a system component in accordance with some embodiments.

FIG. 4A illustrates user interface 205 displaying, and allowing for the selection of, components of a system 402, such as component B 302. In this example user interface 205, which can be displayed via the display 206 of component model computing device 102, displays system inputs 401, which are inputs to system 402, and system outputs 413, which are outputs from system 402. User interface 205 also displays a plurality of components for system 402 including component A 404, component B 302, component C 408, and component D 410. User interface 205 also allows for the selection of a component to determine component options for the selected component. For example, a user may select either component A 404, component B 302, component C 408, or component D 410 via, for example, I/O device 203, to determine component options for the selected component. In some examples, user interface 205 identifies the selected component, such as by highlighting the selected component. User interface 205 also displays a select component icon 412. After a user has selected a component, the user may engage (e.g., via I/O device 203 or via touching, in the case when user interface 205 is a touchscreen) select component icon 412 to obtain component options for the selected component.

Figure 4B:
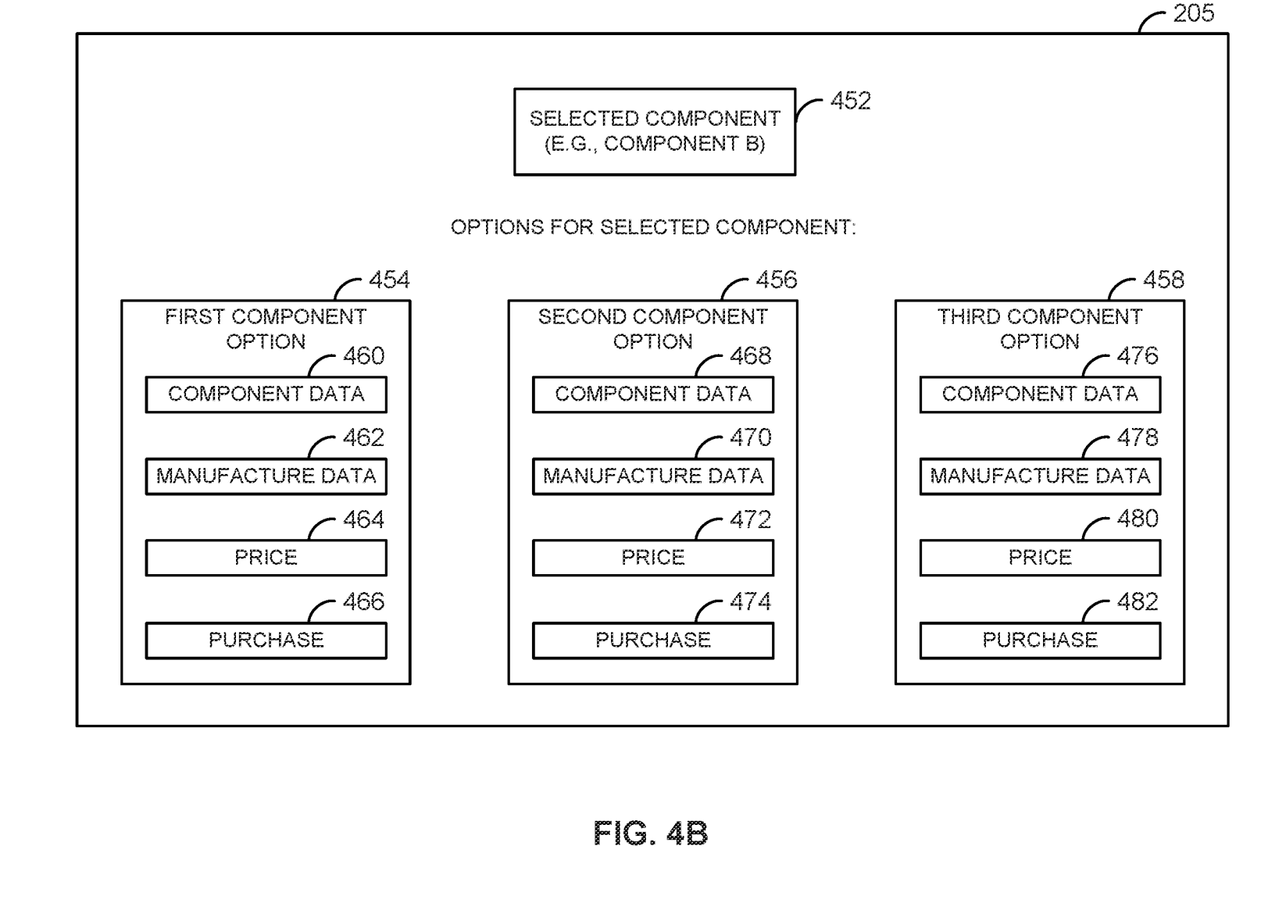
FIG. 4B illustrates another user interface allowing for the selection of a substitute component in accordance with some embodiments.

For example, in response to selecting select component icon 412, user interface 205 may display the selected component 452 as well as component options 454, 456, 458 for the selected component 452, as illustrated in FIG. 4B. Each component option 454, 456, 458 may identify one or more of component data (e.g., an image of the component, specification data, input/output data, etc.), manufacture data (e.g., the manufacture of the component), a price, and a purchase icon allowing for the purchase of the component.

By selecting the purchase icon, for example, a web browser (e.g., displayed via user interface 205) may be redirected to a purchase page for the component from a manufacture or reseller of the selected component. In some examples, the selection of the purchase icon allows for the purchase of the component from the operator of component model computing device 102. For example, the selection of the purchase icon may redirect the web browser to a purchase page where the user can enter identification information and payment information to purchase the selected component.

Specifically, in this example, first component option 454 includes component data 460, manufacturer data 462, a price 464, and purchase icon 466. Second component option 456 includes component data 468, manufacturer data 470, a price 472, and purchase icon 474. In addition, third component option 458 includes component data 476, manufacturer data 478, a price 480, and purchase icon 482.

Figure 5:
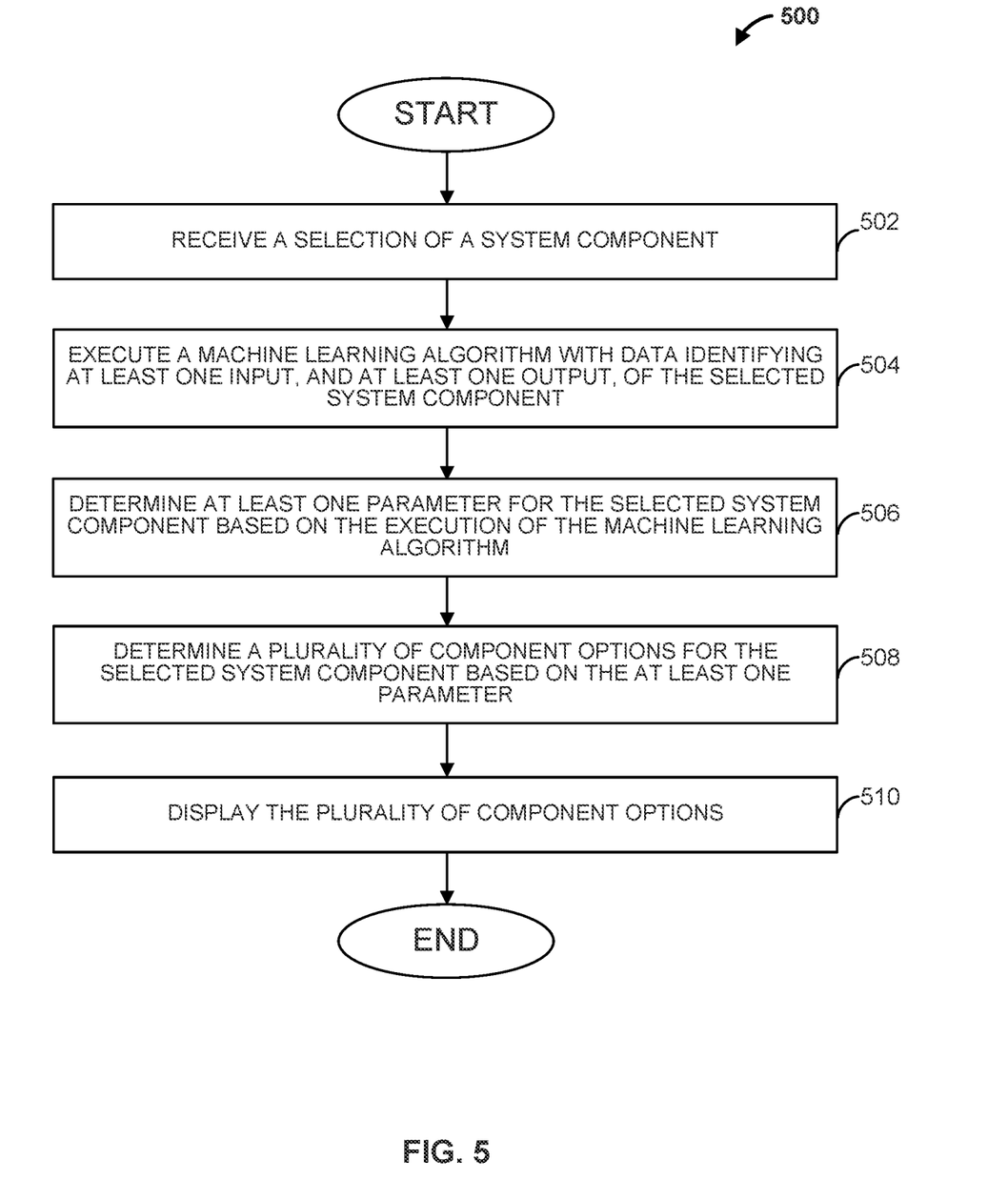
FIG. 5 is a flowchart of an example method that can be carried out by the component model system of FIG. 1 in accordance with some embodiments.

FIG. 5 is a flowchart of an example method 500 that can be carried out by the component model computing system 100 of FIG. 1. Beginning at step 502, a selection of a system component is received. For example, a user may select a component of system 402 displayed in user interface 205 via, for example, an I/O device 203. At step 504, a machine learning algorithm is executed with data identifying at least one input, and at least one output, of the selected system component. The machine learning algorithm may be part of an CM for the selected component. At step 506, at least one parameter for the selected system component is determined based on the execution of the machine learning algorithm. For example, the at least one parameter may be an input, an output, or a requirement for the selected system component.

Proceeding to step 508, a plurality of component options for the selected system component are determined based on the at least one parameter. For example, component options 454, 456, 458 may be selected from model library 119 of database 116. The component options may include or satisfy the at least one parameter determined for the selected system component. At step 510, the plurality of component options are displayed. For example, component options 454, 456, 458 may be displayed to a user via user interface 205. The method then ends.

Figure 6:
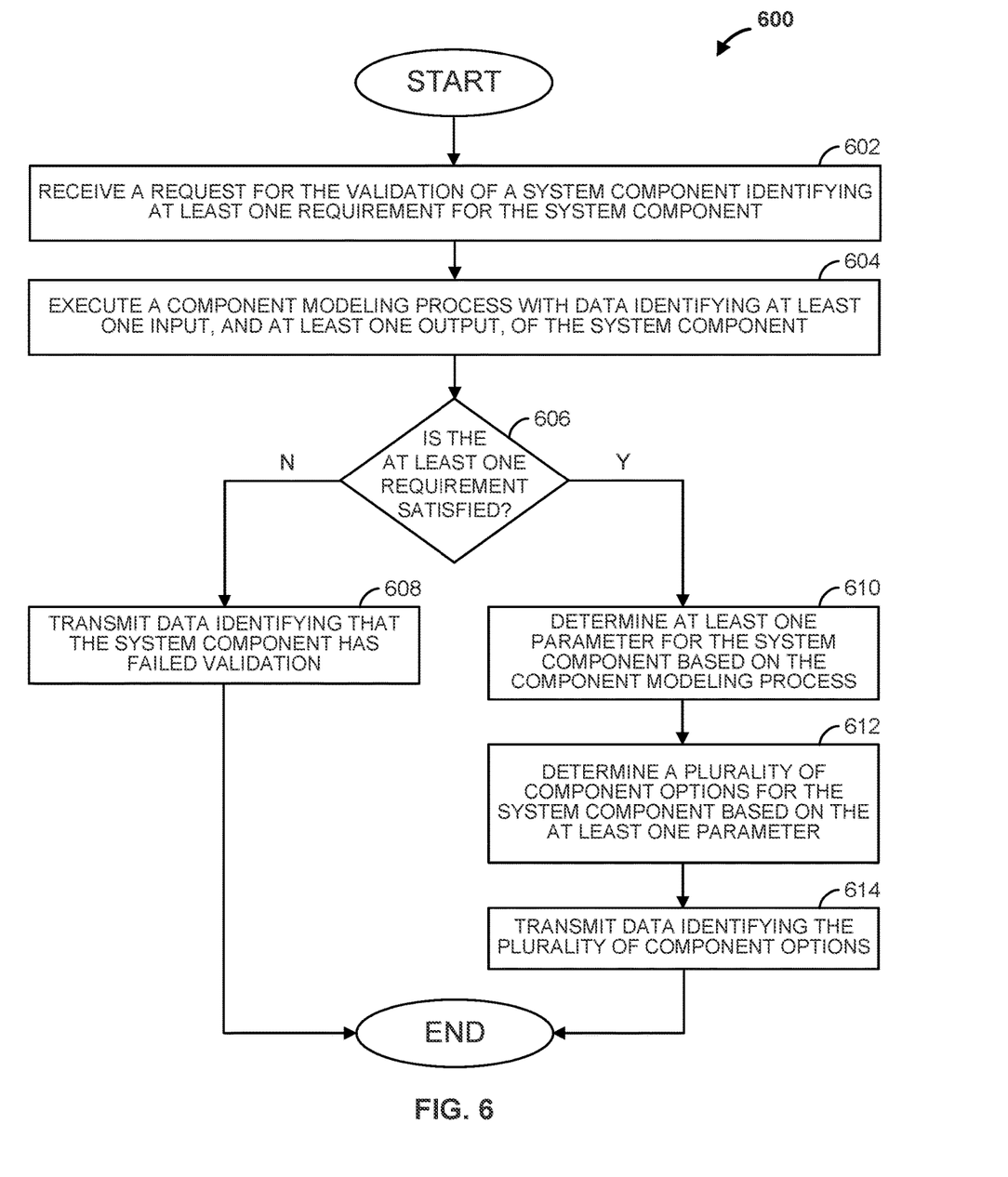
FIG. 6 is a flowchart of another example method that can be carried out by the component model system 100 of FIG. 1 in accordance with some embodiments.

FIG. 6 is a flowchart of another example method 900 that can be carried out by the component model computing system 100 of FIG. 1. Beginning at step 602, a request is received. The request is for the validation of a system component, and identifies at least one requirement for the system component. For example, a request may be received requesting the validation of component B 302, and the request may identify one or more requirements for component B, such as optimized component B free variables 310. At step 604, a component modeling process is executed. The component modelling process may include the execution of an CM for a component as described herein. The modeling process may be executed based on data identifying at least one input and at least one output of the system component. For example, component model computing device 102 may execute a component CM for component B 302 based on component B inputs 304 and component B outputs 306.

Proceeding to step 606, a determination is made as to whether the at least one requirement is satisfied. For example, based on the execution of the modeling process for the system component, component model computing device 102 can determine whether a selection component option for component B 302 can satisfy optimized component B free variables 310. If the component cannot satisfy the at least one requirement, the method proceeds to step 608. At step 608, data is transmitted, such as to another computing device (e.g., a mobile device of a user). The data identifies that the component failed validation. In some examples, the data is displayed to the user via, for example, user interface 205. The method then ends.

Back at step 606, if the component can satisfy the at least one requirement, the method proceeds to step 610. At step 610, at least one parameter for the system component is determined. The determination is based on the results of the component modelling process. The at least one parameter may identify, for example, requirements for one or more free variables of the component. In some examples, the at least one parameter identifies optimized free variables, such as optimized component B free variables 310.

Proceeding to step 612, a plurality of component options for the component is determined. The determination of the plurality of component options is based on the at least one parameter determined in step 610. For example, component model computing device 102 may search model library 119 in database 116 to identify component options that can satisfy the at least one parameter. The method then proceeds to step 614, where data is transmitted, such as to another computing device (e.g., a mobile device of a user). The data identifies the plurality of component options. In some examples, the data (e.g., component options) are displayed to the user via, for example, user interface 205. The method then ends.

In some examples, a computing device is configured to receive a selection of a component of a system, and execute a modeling process for the component. The computing device is also configured to determine at least one parameter for the component based on the execution of the modeling process for the component. Further, the computing device is configured to determine a plurality of component options for the component based on the at least one parameter. The computing device is also configured to display the plurality of component options.

In some examples, the at least one parameter identifies a requirement for the component, and determining the plurality of component options includes determining that each of the plurality of component options satisfy the requirement.

In some examples, displaying the plurality of component options includes displaying an icon that facilitates purchase of one or more of the plurality of component options.

In some examples, executing the modeling process includes executing at least one machine learning algorithm based on data identifying at least one input, and at least one output, of the component.

In some examples, the computing device is further configured to receive a selection of one of the plurality of component options, and display information associated with the selected one of the plurality of component options.

In some examples, the computing device is further configured to receive a selection of one of the plurality of component options, and display a link to a webpage that allows for a purchase of the selected one of the plurality of component options.

In some examples, the computing device is further configured to receive a selection of one of the plurality of component options, and execute a second modelling process for the selected one of the plurality of component options.

In some examples, a method by a computing device includes receiving a selection of a component of a system, and executing a modeling process for the component. The method also includes determining at least one parameter for the component based on the execution of the modeling process for the component. Further, the method includes determining a plurality of component options for the component based on the at least one parameter. The method also includes displaying the plurality of component options.

In some examples, the at least one parameter identifies a requirement for the component, and determining the plurality of component options includes determining that each of the plurality of component options satisfy the requirement.

In some examples, displaying the plurality of component options includes displaying an icon that facilitates purchase of one or more of the plurality of component options.

In some examples, executing the modeling process includes executing at least one machine learning algorithm based on data identifying at least one input, and at least one output, of the component.

In some examples, the method further includes receiving a selection of one of the plurality of component options, and displaying information associated with the selected one of the plurality of component options.

In some examples, the method further includes receiving a selection of one of the plurality of component options, and displaying a link to a webpage that allows for a purchase of the selected one of the plurality of component options.

In some examples, the method further includes receiving a selection of one of the plurality of component options, and executing a second modelling process for the selected one of the plurality of component options.

In some examples, a non-transitory computer readable medium has instructions stored thereon, wherein the instructions, when executed by at least one processor, cause a device to perform operations includes: receiving a selection of a component of a system; executing a modeling process for the component; determining at least one parameter for the component based on the execution of the modeling process for the component; determining a plurality of component options for the component based on the at least one parameter; and displaying the plurality of component options.

In some examples, the at least one parameter identifies a requirement for the component, and determining the plurality of component options includes determining that each of the plurality of component options satisfy the requirement.

In some examples, displaying the plurality of component options includes displaying an icon that facilitates purchase of one or more of the plurality of component options.

In some examples, executing the modeling process includes executing at least one machine learning algorithm based on data identifying at least one input, and at least one output, of the component.

In some examples, the non-transitory computer readable medium further includes instructions stored thereon that, when executed by the at least one processor, further cause the device to perform operations includes: receiving a selection of one of the plurality of component options; and displaying information associated with the selected one of the plurality of component options.

In some examples, the non-transitory computer readable medium further includes instructions stored thereon that, when executed by the at least one processor, further cause the device to perform operations includes: receiving a selection of one of the plurality of component options; and displaying a link to a webpage that allows for a purchase of the selected one of the plurality of component options.

In some examples, a computing device configured to receive a request for a validation of a system component, where the request identifies at least one requirement for the system component. The computing device is also configured to execute a component modeling process based on at least one input, and at least one output, of the system component. Further, the computing device is configured to determine that the at least one requirement is satisfied based on the execution of the component modeling process, and determine at least one parameter for the system component based on the execution of the component modeling process. The computing device is also configured to determine a plurality of component options for the system component based on the at least one parameter, and display the plurality of component options.

In some examples, determining the plurality of component options for the system component includes: accessing a database to retrieve a plurality of component option models for the system component; executing the plurality of component option models; and determining whether each of the plurality of component option models satisfy the at least one parameter.

In some examples, a method by a computing device includes receiving a request for a validation of a system component, wherein the request identifies at least one requirement for the system component. The method also includes executing a component modeling process based on at least one input, and at least one output, of the system component. Further, the method includes determining that the at least one requirement is satisfied based on the execution of the component modeling process, and determining at least one parameter for the system component based on the execution of the component modeling process. The method also includes determining a plurality of component options for the system component based on the at least one parameter, and displaying the plurality of component options.

In some examples, determining the plurality of component options for the system component includes: accessing a database to retrieve a plurality of component option models for the system component; executing the plurality of component option models; and determining whether each of the plurality of component option models satisfy the at least one parameter.

In some examples, a non-transitory computer readable medium has instructions stored thereon, where the instructions, when executed by at least one processor, cause a device to perform operations includes: receiving a request for a validation of a system component, wherein the request identifies at least one requirement for the system component; executing a component modeling process based on at least one input, and at least one output, of the system component; determining that the at least one requirement is satisfied based on the execution of the component modeling process; determining at least one parameter for the system component based on the execution of the component modeling process; determining a plurality of component options for the system component based on the at least one parameter; and displaying the plurality of component options.

In some examples, the non-transitory computer readable medium further includes instructions stored thereon that, when executed by the at least one processor, further cause the device to perform operations includes: accessing a database to retrieve a plurality of component option models for the system component; executing the plurality of component option models; and determining whether each of the plurality of component option models satisfy the at least one parameter.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A computing device comprising:
   a memory storing instructions;
   a database; and
   at least one processor communicatively coupled to the memory and to the database, the at least one processor configured to execute the instructions to:
   for each of a plurality of components of a system:
      compare each of a plurality of feature values for each of a plurality of component options to corresponding optimum feature values; and
      based on the comparisons, determine a ranking of the plurality of component options;
   based on the rankings, generate a model library comprising the plurality of component options for each of the plurality of components;
   store the model library in the database;
   provide for display one or more icons characterizing the plurality of components of the system;
   receive, from an input/output device, a selection of one of the one or more icons;
   based on the selected icon, determine a component of the plurality of components of the system;
   generate input data characterizing at least one input to, and at least one output from, the component;
   obtain, from a database, machine learning model data characterizing an executable modeling process for the component;
   execute the machine learning model for the component based on the input data identifying at least one input to, and at least one output from, the component, wherein the executed machine learning model generates output data characterizing a predicted output of the component;
   determine at least one parameter for the component based on the generated output data characterizing the predicted outputs for the component;
   search the model library within the database to determine at least a portion of the plurality of component options for the component based on the at least one parameter and the ranking of the plurality of component options for the component;
   provide for display an icon that facilitates a purchase of one or more of the plurality of component options;
   in response to a selection of the icon by a user, display a purchase page that allows the user to enter information and purchase the selected component; and
   receive, from the user, the information and complete the purchase.

2. The computing device of claim 1, wherein the at least one parameter identifies a requirement for the component, and wherein determining the plurality of component options comprises determining that each of the plurality of component options satisfy the requirement.

3. The computing device of claim 1, wherein the computing device is further configured to
   display information associated with the selected one of the plurality of component options.

4. The computing device of claim 1, wherein the computing device is further configured to display a link to a webpage that allows for the purchase of the selected one of the plurality of component options.

5. The computing device of claim 1, wherein the computing device is further configured to
   execute a second modelling process for the selected one of the plurality of component options.

6. A method by at least one processor, the method comprising:
   for each of a plurality of components of a system:
      comparing each of a plurality of feature values for each of a plurality of component options to corresponding optimum feature values; and
      based on the comparisons, determining a ranking of the plurality of component options;

based on the rankings, generating a model library comprising the plurality of component options for each of the plurality of components;

storing the model library in a database;

providing for display one or more icons characterizing the plurality of components of the system;

receiving, from an input/output device, a selection of one of the one or more icons;

based on the selected icon, determining a component of the plurality of components of the system;

generating input data characterizing at least one input to, and at least one output from, the component;

obtaining, from a database, machine learning model data characterizing an executable machine learning model for the component;

executing the machine learning model for the component based on the input data identifying at least one input to, and at least one output from, the component, wherein the executed machine learning model generates output data characterizing a predicted output of the component;

determining at least one parameter for the component based on the generated output data characterizing the predicted output for the component;

searching the model library within the database to determine at least a portion of the plurality of component options for the component based on the at least one parameter and the ranking of the plurality of component options for the component;

providing for display an icon that facilitates a purchase of one or more of the plurality of component options;

in response to a selection of the icon by a user, displaying a purchase page that allows the user to enter information and purchase the selected component; and receiving, from the user, the information and completing the purchase.

7. The method of claim 6, wherein the at least one parameter identifies a requirement for the component, and wherein determining the plurality of component options comprises determining that each of the plurality of component options satisfy the requirement.

8. The method of claim 6 further comprising
displaying information associated with the selected one of the plurality of component options.

9. The method of claim 6 further comprising displaying a link to a webpage that allows for the purchase of the selected one of the plurality of component options.

10. The method of claim 6 further comprising
execute a second modelling process for the selected one of the plurality of component options.

11. A non-transitory computer readable medium having instructions stored thereon, wherein the instructions, when executed by at least one processor, cause a device to perform operations comprising:

for each of a plurality of components of a system:
comparing each of a plurality of feature values for each of a plurality of component options to corresponding optimum feature values; and
based on the comparisons, determining a ranking of the plurality of component options;

based on the rankings, generating a model library comprising the plurality of component options for each of the plurality of components;

storing the model library in a database;

providing for display one or more icons characterizing the plurality of components of the system;

receiving, from an input/output device, a selection of one of the one or more icons;

based on the selected icon, determining a component of the plurality of components of the system;

generating input data characterizing at least one input to, and at least one output from, the component;

obtaining, from the database, machine learning model data characterizing an executable machine learning model for the component;

executing the machine learning model for the component based on the input data identifying at least one input to, and at least one output from, the component, wherein the executed machine learning model generates output data characterizing a predicted output of the component;

determining at least one parameter for the component based on the generated output data characterizing the predicted output for the component;

searching the model library within the database to determine at least a portion of the plurality of component options for the component based on the at least one parameter and the ranking of the plurality of component options for the component;

providing for display an icon that facilitates a purchase of one or more of the plurality of component options;

in response to a selection of the icon by a user, displaying a purchase page that allows the user to enter information and purchase the selected component; and receiving, from the user, the information and completing the purchase.

12. The non-transitory computer readable medium of claim 11 wherein the at least one parameter identifies a requirement for the component, and wherein determining the plurality of component options comprises determining that each of the plurality of component options satisfy the requirement.

13. The non-transitory computer readable medium of claim 11 further comprising instructions stored thereon that, when executed by the at least one processor, further cause the device to perform operations comprising
displaying information associated with the selected one of the plurality of component options.

14. The non-transitory computer readable medium of claim 11 further comprising instructions stored thereon that, when executed by the at least one processor, further cause the device to perform operations comprising displaying a link to a webpage that allows for the purchase of the selected one of the plurality of component options.

* * * * *